Patented Mar. 20, 1934

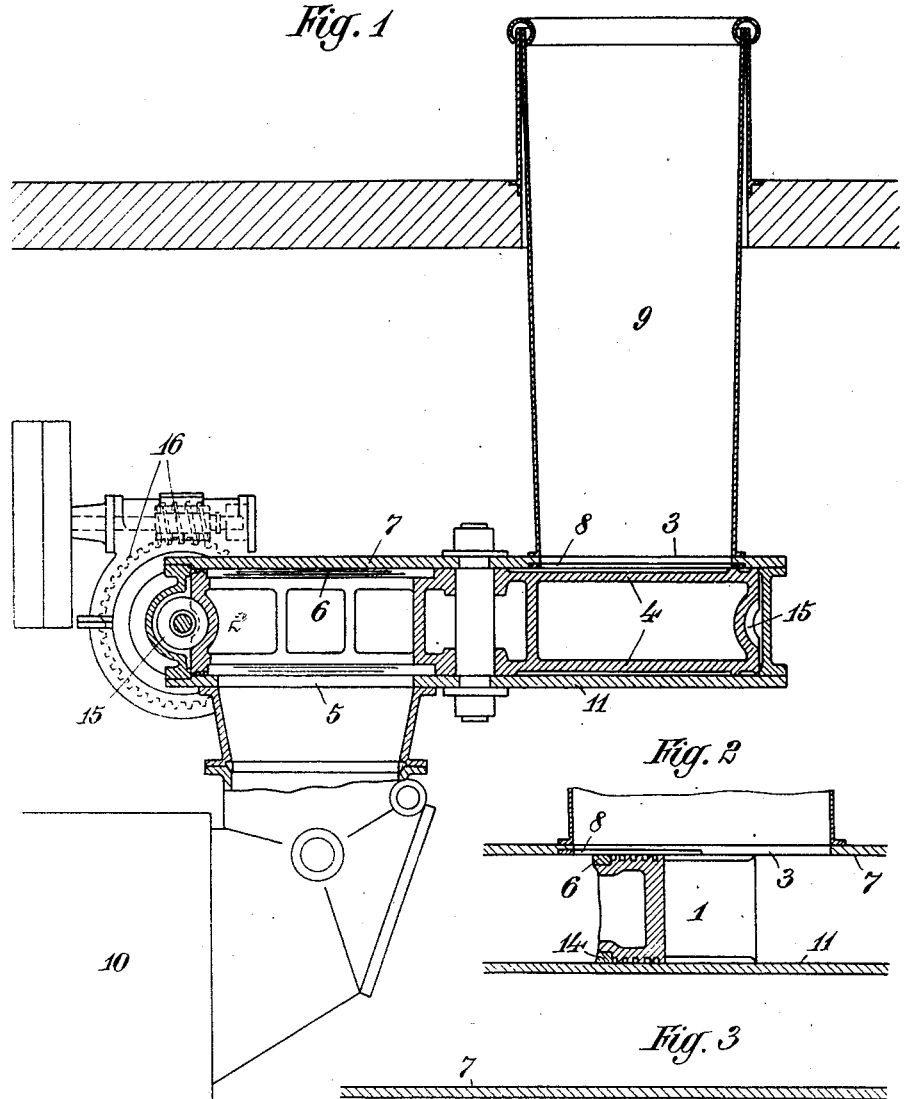

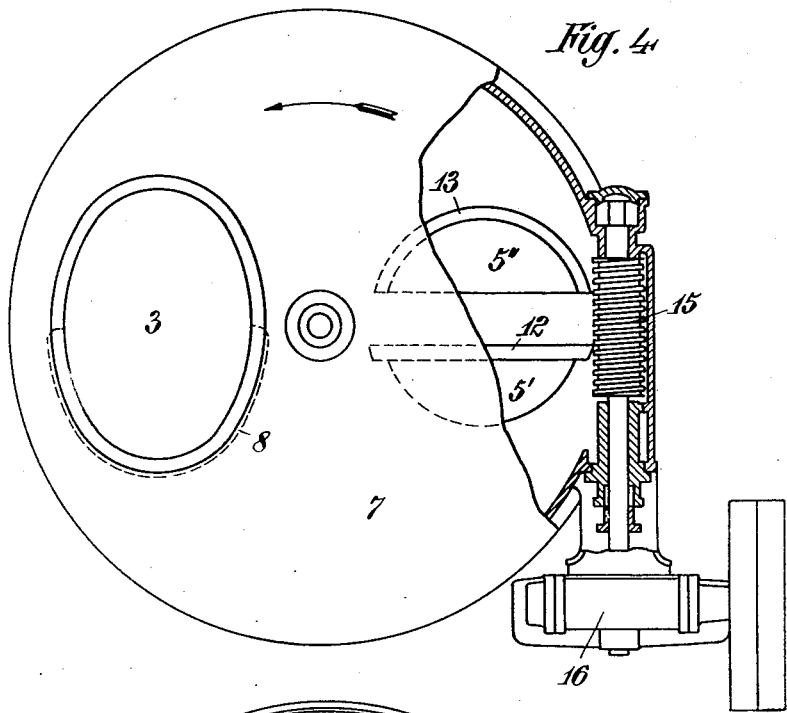
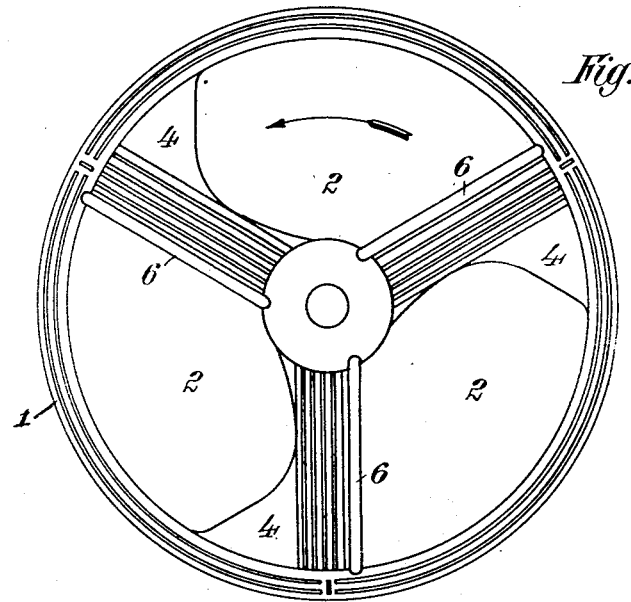

1,951,535

UNITED STATES PATENT OFFICE 1,951,535

APPARATUS FOR SUPPLYING THE MATERIAL TO BE TREATED INTO BOILERS UNDER PRESSURE

August Sommermeyer, Berlin-Wittenau, Germany, assignor to firm Rud. A. Hartmann A.-G., Berlin, Germany, a company of Germany Application January 17, 1931, Serial No. 509,441
In Germany January 2, 1930

5 Claims. (Cl. 146—106)

I have filed applications in Germany, January 2, 1930; in Switzerland, February 17, 1930; in Norway, February 21, 1930; and in Great Britain, March 4, 1930.

My invention relates to apparatus for supplying the material to be treated into boilers under pressure, more particularly continuously into extraction apparatus for the treatment of animal carcases, land animals, aquatic animals, fish, fish waste and so forth. Such apparatus comprise a rotary member, having sector-shaped chambers, which maintain a tight closure of the boiler in every position of said rotary member.

In known apparatus it is necessary to cut up or disintegrate the raw material before introducing it into the rotary member. The particles fall into one of the sector-shaped chambers and are brought, by the slow continuous revolution of the rotary member, over the discharge opening through which they pass into the extracting boiler.

My invention is an improvement upon this apparatus in that it renders previous disintegration of the raw material unnecessary. To this end the sector-shaped chambers of the rotary member are provided with cutting means, while complementary cutting means are fitted to the housing of the rotary member. The charge opening to the rotary member may then be surmounted by a large charging hopper which is adapted to receive undivided animal carcases or large pieces of animal carcases.

The rotary member is revolved continuously, but very slowly. Each piece of material placed in the hopper passes into the particular chamber which is open at the time and is cut up between the cutters on the rotary member itself and the complementary cutting means on the housing. The rotary member, the housing and the cutters are constructed very robustly and enable the largest bones, or even foreign bodies, to be cut through. The cuts made by the apparatus are performed similarly, for example, to those of iron shears.

The invention also provides cutting means for the discharge opening in the bottom of the housing, permitting of the pieces obtained from the first cutting being further disintegrated if desired.

One embodiment of the invention by way of example is illustrated in the accompanying drawings in which:—

Figure 1 is a vertical section through the arrangement.

Figures 2 and 3 are detail sections of the cutters.

Figure 4 is a plan view of the housing, partly in section above the discharge opening and Figure 5 is a plan view of the rotary member.

As illustrated in Figure 5 the rotary member 1 has sector-shaped chambers 2. There may naturally be any desired number of chambers but in the present instance three such chambers are shown. The charge opening 3, as shown in Figure 4, is preferably made elliptical because large pieces of animal carcase or undivided animal carcases pass most easily therethrough. The rear face of the arms 4 which bound the chambers of the rotary member is curved to conform to the shape of the charge opening. The discharge opening 5 may be circular, as shown, or may have any other desired shape.

The rotary member 1 moves in the direction of the arrow in Figure 5. Powerful cutters 6 are mounted at the upper edges of the arms 4. A complementary cutter 8 which may have approximately the form of a half-ellipse, corresponding to the shape of the charge opening 3, is mounted in the housing cover 7 at the edge of said charge opening.

A large piece of animal carcase or an undivided animal carcase is introduced into the large charging hopper 9 by means of suitable lifting apparatus (not shown) and rests at the bottom thereof in the charge opening 3. As soon as a chamber 2 of the rotary member comes opposite the charge opening 3, the lower portion of the piece of raw material enters the chamber. After the opening 3 and chamber 2 have come into full register, further rotation brings the cutter 6 on the next arm 4 within the limits of the opening 3. The cutters 6 and 8 grip said piece of animal carcase and cut it up between them. The portion cut off is carried forward by the same chamber 2 until it comes above the discharge opening 5 through which it is able to slide into the boiler or extractor 10.

In order to disintegrate the pieces cut up by the cutters 6 and 8 still further before they pass into the extractor 10, the discharge opening 5 may be divided into two parts 5' and 5", as shown, for example, in Figures 3 and 4, by a cross piece in the bottom 11 of the housing. The part 5' is fitted with a straight cutter 12 along its edge of the cross piece while the part 5" is fitted with a curved cutter 13. Furthermore the lower edges of the arms 4 of the rotary member 1, are each furnished with a cutter 14. As soon, therefore, as the piece cut off by the cutters 6 and 8 arrives within the limits of the opening 5' it will enter the opening and will only pass right through if it is sufficiently small. Otherwise it will be cut up by the cutter 12 and one of the cutters 14. If the piece remaining is still too large to fall through the opening 5", it will be caught again between the cutters 13 and 14 and cut up afresh. The piece remaining over travels once more through the housing, but is so small that it does not impede the entry into the chamber 2 of a sufficiently large fresh piece of animal carcase.

If desired the division into two parts of the discharge opening 5 may be dispensed with. There is then only a single additional cutting by the cutters 13 and 14. If necessary the opening 5 might, however, be divided into more than two parts.

The rotary member may be driven in any desired manner. In the example illustrated the drive is by way of two worm gears 15 and 16.

It will be readily understood that structural alterations may be made without departing from the spirit of my invention or the ambit of the appended claims.

I claim as my invention:—

1. In an apparatus for feeding animal carcasses and the like to continuously operating extractors, a rotary charging member, a plurality of partitions subdividing said member into a plurality of chambers, cutters fitted along the upper edges of said partitions, cutters fitted along the lower edges of said partitions, a housing for said member provided with a charge opening for the material in the top, and discharge opening in the bottom, a complementary cutter fitted along one edge of said charge opening, cross-pieces in the bottom of the housing adapted to divide said discharge opening into a plurality of parts, further cutters fitted along one edge of said cross-pieces, said top and bottom cutters adapted to cooperate in cutting up the material to be treated during charging.

2. In an apparatus for feeding animal carcasses and the like to continuously operating extractors, a rotary charging member, a plurality of partitions subdividing said member into a plurality of chambers, cutters fitted along the upper edges of said partitions, cutters fitted along the lower edges of said partitions, a housing for said member provided with a charge opening for the material in the top, and discharge opening in the bottom, a complementary cutter fitted along one edge of said charge opening, a cross-piece in the bottom of the housing dividing said discharge opening into two parts, a straight cutter fitted along the edge of the cross-piece of one part, and a curved cutter fitted in the other part, said cutters adapted to cooperate in cutting up the material to be treated during charging.

3. In an apparatus for feeding animal carcasses and the like to a continuously operating extractor under pressure, the combination with a housing having a charging opening and a discharge opening, the latter in direct communication with the extractor under pressure, of a rotor rotatably mounted in said housing, said rotor comprising a plurality of separate compartments revolving with said rotor within said housing and each having an inlet opening for receiving material from said charging opening and an oppositely positioned discharge opening for discharging material into the extractor, and a plurality of cutting means within said housing in registry with said discharge opening.

4. In an apparatus for feeding animal carcasses and the like to a continuously operating extractor under pressure, the combination with a housing having a charging opening in one face thereof and a discharge opening in the opposite face thereof, said discharge opening being in direct communication with the extractor under pressure, a vertical pivot fixedly arranged at approximately the center of said housing, a rotor rotatable in a horizontal plane about said pivot within the housing and comprising a plurality of compartments revolving with the rotor within said housing and each having an upper inlet opening and a lower outlet opening designed to register, respectively, with said charging opening and discharge opening in the housing and a plurality of cutting means carried, respectively, by said rotor and said housing and successively in registry with said discharge and outlet openings during operation.

5. In an apparatus for feeding animal carcasses and the like to a continuously operating extractor under pressure, the combination with the elements claimed in claim 3, of means engaging with the periphery of the rotor for rotating the same.

AUGUST SOMMERMEYER.